Patented Jan. 12, 1954

2,666,035

UNITED STATES PATENT OFFICE 2,666,035

RECLAIMED SILICONE RUBBER

Charles W. Pfeifer, Troy, N. Y., assignor to General Electric Company, a corporation of New York No Drawing. Application November 15, 1951, Serial No. 256,604

12 Claims. (Cl. 260—2.3)

This invention is concerned with the reclaiming of solid elastic organopolysiloxanes in at least a partially cured state. More particularly, the invention is concerned with a method for reclaiming silicone rubber in a vulcanizable form which has been at least partially converted, e. g., by heat, to the state approaching the insoluble and infusible state, which method comprises reducing or comminuting the partially converted solid elastic organopolysiloxane to particles of small size, and thereafter subjecting the aforesaid particles to steam pressure in a closed pressure vessel. The invention also embraces mixtures of non-heat-converted organopolysiloxanes convertible to the solid elastic state with the reclaimed solid elastic organopolysiloxane.

In the molding of silicone rubber, there are often obtained mold flashes of the latter material from the mold, which result from a squeeze-out of the heat-convertible silicone rubber during the pressing operation. These flashes, or "mold flash" as they are often called, are in various states of cure or vulcanization. Since the molding of silicone rubber requires substantially long times and elevated temperatures, for instance, about 10 to 20 minutes at elevated temperatures of the order of about 100° to 175° C., it is apparent that the degree of cure of the silicone rubber can vary widely. Moreover, the amount of mold flash obtained in many instances is sizable and heretofore such mold flash has been discarded and has been considered as part of the loss in the molding of silicone rubber. In addition, it has often been found that after molding a product from silicone rubber and giving it a subsequent heat treatment which is usually necessary to complete the conversion to the substantially insoluble and infusible state, which heat treatment may be of the order of about 1 hour at 150° C. and about 20 to 40 hours at 250° C., if the finally heat-treated product does not meet specifications it must be discarded. This, of course, introduces again a mounting amount of scrap which heretofore has been considered an irreparable loss.

I have now discovered that unexpectedly silicone rubber in at least the partially cured or vulcanized state, that is, either partially cured or completely cured, may be reclaimed in accordance with my invention by first grinding the partially cured or completely cured silicone rubber to a substantially fine state and thereafter subjecting it to steam and pressure in a pressure reactor. The material obtained after this last treatment may be then processed by drying it and masticating it on rubber milling rolls, and can then be reused either alone or in combination with unprocessed organopolysiloxanes convertible to the solid elastic state.

The solid, elastic organopolysiloxanes or "silicone rubbers" as they are now known in the art in the partially or completely cured or vulcanized state (which for brevity will hereinafter be referred to as the "cured organopolysiloxane") may be prepared from any of the countless number of silicone rubber formulations heretofore known. Thus, the uncured or unvulcanized composition may be prepared by hydrolyzing for instance dimethyldichlorosilane with or without added amounts of, for instance, trifunctional material as, for instance, methyl trichlorosilane which may be present in an amount up to about 0.3 mol per cent, and thereafter condensing the hydrolyzed product by the use of various catalysts known in the art as, for instance strong alkalis, for example, sodium hydroxide, potassium hydroxide, etc.; various acidic materials, for instance, sulfuric acid, ferric chloride, hexahydrate, phosphoric acid, phenyl phosphoryl chloride, etc. The heat-curable organopolysiloxanes, for example, the hydrocarbon-substituted polysiloxanes, which may later be converted to the incompletely or completely cured or vulcanized state, may be described as polysiloxanes consisting of hydrocarbon radicals, and silicon and oxygen atoms having the recurring structural unit

where R and R' are the same or different monovalent hydrocarbon radicals, for example, aliphatic radicals, for instance, alkyl radicals, e. g., methyl, ethyl, propyl, isopropyl, butyl, octyl, etc., radicals; unsaturated aliphatic radicals, e. g., vinyl, allyl, etc., radicals; aryl radicals, for instance, phenyl, naphthyl, etc., radicals; aralkyl radicals, for instance, benzyl, phenylethyl, etc., radicals; alkaryl, for instance, tolyl, ethylphenyl, etc., radicals; cyclic radicals, for instance, thienyl, cyclopentyl, cyclohexyl, etc., radicals. Preferably R and R' are lower alkyl radicals, more particularly the methyl radical and are the same and may contain a small amount of, for instance, from 1 to 30 mol per cent of aryl, for example, phenyl radicals.

The heat - curable hydrocarbon - substituted polysiloxanes preferably contain at least 40 mol per cent dialkyl siloxy units of the total number of organosiloxy units in the siloxane. By siloxy unit is mean any unit which corresponds to one of the following empirical formulae, $SiO_2$, $RSiO_{3/2}$, $R_2SiO$, and $R_3SiO_{1/2}$, where R is a monovalent organic radical attached to silicon by carbon-silicon linkages and is similar to those mentioned for R and R' above. The organosiloxane contains an average of from 1.75 to 2.25 organic radicals per silicon atom and may contain some uncondensed hydroxyl groups as well as very small amounts of residual unhydrolyzed hydrolyzable radicals from the starting materials used to make the organopolysiloxanes. It will, of course, be apparent that in making the heat-curable organopolysiloxanes, in addition to the dialkyl siloxy unit, for example, dimethyl siloxy units, there may also be present diphenyl siloxy units or methyl phenyl siloxy units in amounts ranging, for example, from about 0.5 to 30 or more mol per cent of the total number of siloxy units.

A more complete description of the nature of the heat-curable organopolysiloxanes which may be used in obtaining the partially converted or completely converted organopolysiloxane rubbers (which in turn may be reclaimed according to my process) may be found, for example, in Wright et al. Patent 2,448,565, Agens Patent 2,448,756, Elliott et al. Patent 2,457,688, Marsden Patent 2,521,528, and Warrick Patents 2,460,795 and 2,541,137. These aforementioned patents also contain various methods by which the uncured organopolysiloxanes may be obtained from various liquid non-resinous hydrocarbon-substituted polysiloxanes using different condensation catalysts including, for example, iron halides such as, for instance, $FeCl_3$, KOH, NaOH, benzoyl peroxide, etc. It is desired to point out that after conversion of the liquid non-resinous hydrocarbon-substituted polysiloxane to the condensed organosiloxane state (convertible to the solid elastic state by elevated temperatures preferably in the presence of curing or vulcanizing agents), the intermediate convertible organopolysiloxane may be a solid somewhat elastic material or a gel, or it may be in the form of a highly viscous mass which is usually obtained when one condenses a liquid or non-resinous organopolysiloxane containing an average of close to two or exactly two organic groups, for example, methyl groups or methyl and phenyl groups per silicon atom using such catalysts as, for example, potassium hydroxide, etc.

When the ratio of organic groups per silicon atoms is below two, and thus may contain small amounts of copolymerizable monoorganosiloxane, for instance, monomethyl siloxane, the products obtained are usually solid fusible elastic gels and can be formed by the condensation of the starting material using such catalysts as, for example, potassium hydroxide, ferric chloride, etc. In such cases, the heat-convertible organopolysiloxane may contain an average of from 1.95 up to 2.0 organic groups per silicon atom and may contain up to 0.5 mol per cent copolymerized monoorganosiloxane, for example, monomethyl siloxane.

In order to prepare synthetic elastomers from the starting condensed convertible organopolysiloxane, the latter may be worked on ordinary mixing or differential rubber rolls until the desired consistency is obtained. Thereafter various cure or vulcanization accelerators, and fillers may be added during this operation. After being formed to the desired shape in molds under the influence of heat and pressure, this synthetic elastomer is usually further heat treated in an oven until the desired degree of cure is obtained.

Among the catalysts which may be used accelerating the cure of the heat-convertible organopolysiloxane are, for example, benzoyl peroxide, tertiary butyl perbenzoate, zirconyl nitrate, 2-azo-bis-isobutyronitrile, boron hydrides, etc. These cure accelerators may be used in amounts ranging, for example, from about 0.1 to 10 per cent or more by weight of the heat-convertible organopolysiloxane and preferably are present in amounts ranging from about 0.5 to 4 per cent, by weight, thereof. Although larger amounts of catalysts may be employed, the amount employed as a curing agent ordinarily should not exceed in most cases about 6 per cent, particularly where the finally cured product will be continuously subjected to elevated temperatures.

During the processing of the heat-curable organopolysiloxane (for example, highly viscous curable or solid elastic curable hydrocarbon-substituted polysiloxanes) various fillers may be incorporated, especially inorganic fillers such as, for instance, lithopone, ferric oxide, titanium dioxide, talc, zinc oxide, etc. Various forms of silica, e. g., silica aerogel, are advantageously employed for optimum physical properties. The aforementioned fillers may be incorporated in the convertible organopolysiloxane in amounts ranging from about 10 to 90 per cent or higher preferably from about 25 to 75 per cent of the total weight of the filler and the heat-convertible organopolysiloxane.

The filled heat-convertible organopolysiloxanes, preferably containing the cure accelerators described above, may then be molded under heat and pressure, for example, at temperatures of from about 100° to 175° C. for from about 10 to 25 minutes under pressures of the order of, for example, from about 5 to 1000 or more p. s. i. Thereafter it is generally desirable to further heat-treat the molded product, for instance, in an oven, at temperatures of the order of about 150° to 250° C. for times ranging from about 1 to 40 hours or more, depending on the temperatures used, to complete the cure.

Obviously, if the molding composition, that is, the heat-convertible organopolysiloxane containing cure accelerator and filler has not been heat-treated to any appreciable extent in the mold and has not been further subjected to heating at the elevated temperatures described above, for instance, in an oven, then it may not be necessary to subject such heat-convertible materials to my reclaiming process but it may only require plasticization by remilling, after which it can then be used in the same manner as the reclaim herein can be employed. One way to determine whether steam-autoclaving is necessary for the partially cured heat-convertible organopolysiloxane is to plasticize it by milling to get a smooth homogeneous sheet. Generally if impractically excessive milling is necessary to obtain such a sheet, then my reclaim process is recommended under such circumstances. Where the molded product has gone through the complete cycle of heating at the elevated temperatures required to complete the curing or vulcanization thereof, it is at this point that my invention can be used to greatest advantage. Such cured materials may then be ground on a rubber mill (for this purpose disintegration may be carried out on a heavy two-roll mill known as a cracker, and then reground until satisfactory) so that it is reduced to a convenient average particle size of the order of about 5 to 50 mesh. Of course, it will be apparent to those skilled in the art that smaller or larger average particle sizes may be employed without departing from the scope of the invention, and the actual particle size is not critical. However, where particles of larger average size are employed, longer periods of treatment with steam pressure in the pressure vessel may be required than are necessary when the average particle size of the ground silicone rubber is smaller. If the particles of ground rubber are too fine, subsequent steam treatment may result in undesirable degradation of the cured material.

Thereafter the ground solid elastic organopolysiloxane is placed in a pressure vessel, for example, an autoclave, the latter closed and steam under pressure introduced directly into the autoclave at pressures ranging, for example, from 5 to 1000 p. s. i. or more of steam, advantageously around 10 to 200 p. s. i. Obviously, the greater the steam pressure employed, the less time required for conversion of the partly or completely vulcanized organopolysiloxane to a usable form. Generally I have found that where the average particle size is from about 10 to 20 mesh, it is satisfactory to use from about 20 to 60 pounds of steam pressure in the autoclave ranging from about 1 to 10 hours. As will be apparent to persons skilled in the art, higher or lower steam pressures as well as longer or shorter periods of time (e. g., as high as 30 hours) may be employed depending, for example, on the degree of cure of the solid elastomeric polysiloxane, the particle size of the organopolysiloxane, and, of course, the interaction between the steam pressure and the time.

An alternative method for treating the ground organopolysiloxane comprises introducing into the pressure vessel the organopolysiloxane with water sufficient to generate an adequate amount of steam. Thereafter the vessel may be heated at a sufficiently high enough temperature to convert the water in the vessel to steam so as to effect the reclaiming treatment and results described above.

After treatment with the steam pressure, it is preferable to dry the steam-treated rubber before further processing. This may be done, for example, by pressing and centrifuging and then passing the steam-treated particles through a hot air blast or through an oven (using for instance, continuous belt driers) which will hasten the drying of the rubber but will not affect the usability in the later processing with the unvulcanized material. Temperatures of about 125° C. to 200° C. are advantageously employed for this purpose. Thereafter, I have found it advisable to plasticize the reclaimed rubber by milling it on rubber differential rolls (e. g., mixing rolls or refining rolls) until it is sufficiently plasticized and a homogeneous sheet is obtained.

It should be apparent that in the reclaiming of the solid elastic organopolysiloxane to a usable form, consideration must be given to the type of filler incorporated therein. Finely divided fillers such as silica aerogel, various silicas, titanium dioxide, etc., lend themselves readily to such reclaiming procedures. However, where fibrous fillers such as glass fibers, asbestos fibers, etc., are employed, it may be necessary to attempt to remove the fillers from the solid elastic organopolysiloxane either before or after steam pressure treatment by shredding or by other suitable means. Generally, this may not be necessary if the fibers are in sufficiently finely divided state and if the incorporation of the fiber-filled cured organopolysiloxane, for example, asbestos- or glass fiber-filled solid elastomer organopolysiloxane in the reclaimed state is to be combined with a filled unvulcanized organopolysiloxane which contains fillers compatible or usable with the fibrous fillers of the reclaimed material. For the most part fillers employed at the present time in manufacturing silicone rubber articles are generally finely divided or powdery fillers such as titanium dioxide, silica aerogel, silicas in various other forms, etc. It may well be that after steam pressure treatment and plasticization on the rubber differential milling rolls, the fibers of glass or of asbestos will be sufficiently broken down so that there will be little difficulty in blending them properly with other filled heat-curable organopolysiloxanes.

The reclaimed silicone rubber or organopolysiloxane may then be mixed on regular rubber differential milling rolls with the uncured, non-reclaimed, previously unvulcanized, heat-convertible organopolysiloxane which as pointed out above may be in the highly viscous liquid state, or in the gelled state, or in the solid elastic state.

The reclaimed silicone rubber, if it is to be used alone, may be mixed with additional amounts of cure accelerator, e. g., benzoyl peroxide, in amounts ranging for example, from about 0.5 to 5 per cent, by weight, based on the weight of the organopolysiloxane present therein, and molded under heat and pressure in the same way as was done with the unvulcanized material. Alternatively, the reclaimed silicone polymer may be mixed in varying amounts with unvulcanized polymer (with or without filler) and subjected to a curing cycle in the same manner as was done with the original material. In such instances, depending on the amount of reclaimed silicone rubber used, the additional amounts of catalyst employed may be varied within wide limits. Where the reclaimed silicone rubber is mixed with the unvulcanized material, additional amounts of curing agent, for example, benzoyl peroxide, are advantageously employed. I have found that when the amount of reclaimed rubber (containing filler) is around 10 to 20 per cent of the total weight of the latter and a comparably filled unvulcanized heat-convertible organopolysiloxane, that generally additional amounts of curing agents are not necessary to take into account the addition of the reclaim since the amount of cure accelerator which is used with the unvulcanized compound is sufficient to cure the mixture of the unvulcanized gum or heat-curable organopolysiloxane and the reclaimed silicone rubber. Generally when the amount of reclaim exceeds about 20 to 25 per cent of the aforesaid mixture of ingredients taking into consideration the amount of organopolysiloxane in both ingredients, I have found it advantageous to add additional amounts of curing agent to the mixture of the reclaimed and the unvulcanized molding composition. This amount may vary depending, for example, on the type of organopolysiloxane used (both in the vulcanized and unvulcanized product), the percentage of reclaim employed, the type of filler used, on the amount of curing agent in the unvulcanized material, on the physical properties desired, etc. By weight, I advantageously may use additionally from about 0.1 to 4 or 5 per cent curing agent, based on the weight of the silicone rubber, exclusive of filler, present in the reclaim.

In order that those skilled in the art may better understand how the present invention may be practiced, the following examples are given by way of illustration and not by way of limitation. All parts are by weight. The vulcanizable material described in the following examples was prepared essentially as follows. Substantially pure dimethyldichlorosilane was hydrolyzed with water and the isolated hydrolysis product which comprised a mixture of cyclic polymers of dimethyl siloxane was then condensed by the addition of about 0.01 per cent thereof, by weight, KOH until a highly viscous material having only slight flow at room temperature was obtained. To 100 parts of this highly condensed material was added 45 parts of a silica aerogel (specifically Santocel C manufactured by Monsanto Chemical Company) and 1.65 parts benzoyl peroxide. The ingredients were mixed together on compounding rolls used in rubber milling until a homogeneous mixture was obtained. This compound will hereinafter be referred to as "vulcanizable material."

EXAMPLE 1

In this example, the vulcanizable material described above was molded in a press for 15 minutes at about 260° F. at a pressure of about 500 p. s. i. to give an incompletely cured product. To illustrate the reclaiming of this partially cured composition in accordance with the concept of my invention, the cured material was ground on a rubber mill to approximately 10 mesh and then subjected directly to 40 pounds pressurized steam in an autoclave for two hours. Thereafter, the pressure-treated composition was dried for 1½ hours at 150° C. in an air-circulating oven to remove residual moisture and then plasticized by milling it on a cold rubber differential mill for about 5 to 10 minutes until a smooth sheet was obtained. Obviously longer milling times may be employed where circumstances recommend. This reclaimed product, which was quite plastic and resembled unvulcanized filled methylpolysiloxane was thereafter mixed with varying amounts of the vulcanizable material. The following Table I shows the proportions in which the reclaimed material was mixed with the vulcanizable material and also shows the amounts of additional catalyst which were added to the mixtures of the reclaim and the vulcanizable material. In addition as controls, samples were molded and processed using only the vulcanizable material (that is the vulcanizable material including the filler) and using only the reclaimed material.

Table I

|  | Sample No. | | | | |
|---|---|---|---|---|---|
|  | A | B | C | D | E |
| Percent reclaim | 0 | 15 | 25 | 50 | 100 |
| Percent vulcanizable material | 100 | 85 | 75 | 50 | 0 |
| Percent benzoyl peroxide | 0 | 0 | 0.3 | 0.6 | 1.2 |

Samples were molded from each of the mixtures or the vulcanized material or reclaimed material separately for 15 minutes at 260° F. in a mold at about 500 p. s. i. and thereafter further heat-treated in an air circulating oven for one hour at 300° F. At the end of this time the properties of the molded samples were tested with the following results as shown in Table II.

Table II

| Physical properties | Sample No. | | | | |
|---|---|---|---|---|---|
|  | A | B | C | D | E |
| Shore A hardness | 40 | 39 | 38 | 41 | 45 |
| Tensile p. s. i. | 955 | 1,000 | 900 | 670 | 520 |
| Percent elongation | 345 | 385 | 350 | 190 | 150 |
| Tear lb./in. | 79 | 85 | 79 | 47 | 31 |

From the results shown in Table II it is apparent that the incorporation of up to about 25 per cent reclaim with the vulcanizable material did not adversely affect the properties of the heat-cured product. In some respects (Sample No. B) the addition of the reclaimed organopolysiloxane improved some of the strength properties.

EXAMPLE II

In this example the mixtures of vulcanizable material and reclaimed material described in Example I as well as the vulcanizable material alone and the reclaimed material alone (described in Table I above) were molded for 15 minutes at 260° F. under a pressure of about 500 p. s. i. Thereafter the molded products were further heat-treated in an air circulating oven for 24 hours at 480° F. and tested with the results as shown below in Table III.

Table III

| Physical properties | Sample No. | | | | |
|---|---|---|---|---|---|
|  | A | B | C | D | E |
| Shore A hardness | 45 | 46 | 43 | 48 | 50 |
| Tensile p. s. i. | 860 | 875 | 930 | 655 | 560 |
| Percent elongation | 255 | 250 | 260 | 150 | 110 |
| Tear lb./in. | 66 | 69 | 64 | 49 | 34 |

Again as was shown in Table II, the results in Table III indicate that the presence of up to 25 per cent, by weight, reclaimed material with the vulcanizable material did not adversely affect the properties of finely cured product and in the case of 25 per cent reclaim, the properties, particularly the tensile strength and per cent elongation were somewhat better.

EXAMPLE III

The vulcanizable material described above was subjected to more complete vulcanization or curing conditions than was the material described in Example I. More particularly, the vulcanizable material was molded in a press under pressure of 500 p. s. i. for 15 minutes at about 260° F. and thereafter further heat-treated in an air circulating oven for 1 hour at 300° F. and then for 40 hours at 480° F. The cured silicone rubber sample was ground on a rubber mill to approximately 10 mesh as was done in Example I and thereafter subjected to 40 lb. steam pressure in an autoclave for 3 hours, similarly as was done in Example I, and finally dried and plasticized by refining, that is by passing it through the rolls of a rubber mill similarly as in Example I, until a sheeted composition was obtained. This reclaimed material was thereafter mixed with varying per cents of vulcanizable material as was done in Examples I and II, using the same proportion of reclaimed to the vulcanizable material and the same amounts of benzoyl peroxide. The mixtures of the reclaimed and vulcanizable materials as well as the reclaimed material alone and the vulcanizable material alone as controls were then pressed for 15 minutes in a mold under a pressure of about 500 p. s. i. at 260° F. and thereafter one hour at 300° F. in an air-circulating oven. These molded products were then tested with the following results described in Table IV below.

*Table IV*

| Physical properties | Sample No. | | | | |
|---|---|---|---|---|---|
| | A | B | C | D | E |
| Shore A Hardness | 40 | 39 | 42 | 43 | 50 |
| Tensile p. s. i | 955 | 865 | 755 | 720 | 440 |
| Percent elongation | 345 | 320 | 255 | 185 | 94 |
| Tear lb./in | 79 | 72 | 66 | 61 | 36 |

When the above molding compositions were molded instead for 15 minutes at 260° F. in the same press using the same pressure and then heated in an air circulating oven for 24 hours for 480° F., the following physical properties were obtained as shown in Table V:

*Table V*

| Physical properties | Sample No. | | | | |
|---|---|---|---|---|---|
| | A | B | C | D | E |
| Shore A hardness | 45 | 44 | 46 | 49 | 52 |
| Tensile p. s. i | 860 | 885 | 740 | 630 | 450 |
| Percent elongation | 255 | 255 | 195 | 145 | 90 |
| Tear lb./in | 66 | 50 | 59 | 49 | 23 |

EXAMPLE IV

In this example, mold flash obtained squeezed out during molding the vulcanizable composition described above for 15 minutes at 260° F. in the press was the sole material used for compounding with the vulcanizable material alone. The mold flash was ground to approximately 10 mesh, subjected to 40 lb. steam pressure in an autoclave for 5 hours, dried and plasticized by refining on a rubber mill until a reclaimed sheet material was obtained. Thereafter, the reclaimed product was mixed with curing agent and the vulcanizable material in the same proportions as described in Table I above using as controls 100% reclaim and 100% vulcanizable material. The mixtures and individual molding compounds were then pressed for 15 minutes at 260° F. in a mold at 500 p. s. i. and further heated for one hour at 300° F. in an air-circulating oven and tested with the following results as shown in Table VI.

*Table VI*

| Physical properties | Sample No. | | | | |
|---|---|---|---|---|---|
| | A | B | C | D | E |
| Shore A hardness | 40 | 40 | 41 | 40 | 40 |
| Tensile p. s. i | 955 | 870 | 815 | 505 | 780 |
| Percent elongation | 345 | 330 | 235 | 190 | 215 |
| Tear lb./in | 79 | 80 | 78 | 69 | 45 |
| Percent linear shrinkage | 4.9 | 4.7 | 4.5 | 4.0 | 3.1 |

Instead of the heat treatment for 1 hour at 300° F., the molded samples (proportioned as in Table I) comprising curing agent and the mixtures of the flash reclaim and the vulcanizable material, or the latter materials alone, were molded for 15 minutes at 260° F. and thereafter heated in an air-circulating oven for 24 hours at 480° F. These materials as well as controls were also tested with the results shown in Table VII below.

*Table VII*

| Physical properties | Sample No. | | | | |
|---|---|---|---|---|---|
| | A | B | C | D | E |
| Shore A hardness | 45 | 43 | 48 | 47 | 49 |
| Tensile p. s. i | 860 | 850 | 780 | 760 | 705 |
| Percent elongation | 255 | 255 | 180 | 170 | 140 |
| Tear lb./in | 66 | 62 | 60 | 48 | 51 |

It will be apparent from an examination of Table VI that the presence of the reclaimed material improves the per cent linear shrinkage of the molded product. This is an unexpected and unobvious result and is a desirable result in the molding of many silicone rubber objects.

EXAMPLE V

It has also been discovered that the addition of reclaimed silicone rubber to the unvulcanized material improves the compression set of the latter when it is compounded with a curing agent and heat-treated in the usual manner. More particularly, mixtures of the vulcanizable material described in Example I were molded for 15 minutes at about 260° F. at a pressure of about 500 p. s. i. and thereafter cured in an air-circulating oven for 40 hours at 480° F. The cured rubber was ground to approximately 20 mesh average particle size, similarly as was done in Example I and autoclaved for 5 hours at 40 lb. steam pressure. The product was dried and plasticized on milling rolls in the manner described above in Example I. The reclaimed material thus obtained was blended with the uncured vulcanizable composition described above in the same proportions as outlined in Table I (supra) and these blends together with samples comprising 100% reclaimed rubber and 100% unvulcanized material (containing filler as was the case heretofore) were molded for 15 minutes at 260° F. and then further heat-treated in an oven for 24 hours at 480° F. Thereafter, each of the samples was tested for hardness and per cent compression set with the results shown in Table VIII.

*Table VIII*

| Percent reclaim | 0 | 15 | 25 | 50 | 100 |
|---|---|---|---|---|---|
| Percent vulcanizable compound | 100 | 85 | 75 | 50 | 0 |
| Shore A hardness | 51 | 50 | 50 | 50 | 51 |
| Percent compression set (after 22 hr./300° F.) | 60.7 | 54.0 | 55.5 | 52.4 | 46.5 |

It is clearly apparent from the results shown in Table VIII that the per cent compression set (which was measured by the standard A. S. T. M. procedure) was improved as the amount of reclaimed silicone rubber increased.

It will, of course, be apparent to those skilled in the art that the types of partially or completely heat-cured organopolysiloxanes which may be employed in the practice of the invention may be varied and that the vulcanizable material used with the reclaimed material or from which the reclaimed material is derived may also be modified as regards the type of gum, or gel, or high viscosity heat-convertible organopolysiloxane used, the type of filler employed therein, the specific curing agent used in making the partially or completely cured solid elastic organopolysiloxane, etc. In addition, the process for treating the at least partially cured solid elastic organopolysiloxane may be varied, as, for example, the time and pressure at which the heat-convertible material is subjected to steam, or the degree of reduction to size to usable particles, etc.

In addition, when mixing the reclaimed material with the vulcanizable material, the amount or type of curing agent used or the conditions of molding may also be modified within the scope of the invention. The amount of reclaimed solid elastic organopolysiloxane which may be mixed with a vulcanizable material may also be varied within wide limits as pointed out above. Thus, referring specifically to the solid elastic organopolysiloxane in the reclaimed product comprising the latter and a filler, I may use from about 0.5 to 99.5 per cent of the reclaimed solid elastic organopolysiloxane with the vulcanizable material, said percentage being based on the total weight of the solid elastic organopolysiloxane in the reclaimed material and the heat-convertible organopolysiloxane in the vulcanizable material. Generally, there is a recognizable effect as the amount of reclaimed material introduced into the vulcanized material increases, starting with amounts as small as 5%. However, for many instances where optimum properties are desirable, especially where properties comparable to those found in molded products derived from the vulcanizable material alone, I have found that up to 25 per cent of the mixture of the reclaimed solid elastic organopolysiloxane (exclusive of the filler therein) based on the total weight of the unfilled reclaimed material and the vulcanizable heat-convertible organopolysiloxane (also exclusive of filler) may be employed with results which are essentially equivalent in many instances to those obtained using the vulcanizable material alone for molding, extruding or coating applications. Generally, the tensile strength properties of the mixtures of the reclaimed and the vulcanizable material tend to decrease as one adds more than 25% of the reclaimed solid elastic organopolysiloxane. This, of course, does not mean that in many applications larger amounts of reclaimed solid elastic organopolysiloxane may not be used with advantage where lower strength properties on the finally cured silicone rubber are adequate for the application involved.

The invention herein described and claimed has many uses in the molding, extruding and coating applications for which silicone rubber is eminently suitable. It is possible by means of this invention to improve the shrinkage and compression set properties of molded products by incorporating varying amounts of reclaimed solid elastic organopolysiloxanes. Obviously, considerable savings in money may be realized in view of the fact that discarded scrap silicone rubber can now be reused to supplement the supply of vulcanizable silicone rubber and further reduce the cost thereof by the use of this reclaimed silicone material. Mixtures of the reclaimed product and vulcanizable silicone rubber or even from the reclaimed silicone rubber alone may be used to mold objects having extremely high heat resistance and having good flexibility at low temperatures, properties which are inherent in silicone rubber polymers. Such properties are especially desirable in insulation for conductors and in gaskets where extremes in temperatures may be encountered during the use of the material.

As pointed out previously, other types of heat-convertible organopolysiloxanes which can be used as vulcanizable materials to be mixed with the reclaimed solid elastic organopolysiloxane may be employed in place of the ones enumerated in the examples above. Obviously, the reclaimed products may also be prepared from other types of organopolysiloxanes, many examples of which are given above.

What I claim as new and desire to secure by Letters Patent of the United States is:

1. A composition of matter comprising, by weight, (1) from 50 to 95 per cent of a non-reclaimed, previously unvulcanized methyl polysiloxane convertible by heat to the solid elastic state and (2) from 5 to 50 per cent of a reclaimed, vulcanizable, solid, elastic methyl polysiloxane convertible by heat to the solid, elastic, substantially infusible and insoluble state obtained by comminuting to a finely divided state a solid, elastic methyl polysiloxane which is in at least a partially cured state, and thereafter subjecting the finely divided material in a closed pressure vessel at elevated temperatures to direct contact with pressurized steam until a readily millable and peroxide-vulcanizable product is obtained, both methyl polysiloxanes of (1) and (2) containing an average of from 1.75 to 2.25 methyl groups per silicon atom.

2. A composition of matter comprising, by weight, (1) from 50 to 95 per cent of a non-reclaimed, previously unvulcanized, methyl phenyl polysiloxane convertible by heat to the solid, elastic state and (2) from 5 to 50 per cent of a reclaimed, vulcanizable, solid, elastic methyl phenyl polysiloxane convertible by heat to the solid, elastic, substantially infusible and insoluble state obtained by comminuting to a finely divided state a solid elastic methyl phenyl polysiloxane which is in at least a partially cured state, and thereafter subjecting the finely divided material in a closed pressure vessel at elevated temperatures to direct contact with pressurized steam until a readily millable and peroxide-vulcanizable product is obtained, both of the aforesaid methyl phenyl polysiloxanes of (1) and (2) containing an average of from 1.75 to 2.25 total methyl and phenyl groups per silicon atom.

3. A heat-convertible composition of matter comprising, by weight, (1) from 50 to 95 per cent of a non-reclaimed, previously unvulcanized, filled hydrocarbon-substituted polysiloxane convertible by heat to the solid, elastic state, (2) from 5 to 50 per cent of a reclaimed, vulcanizable, filled, solid, elastic hydrocarbon-substituted polysiloxane convertible by heat to the solid, elastic, substantially infusible and insoluble state obtained by comminuting to a finely divided state a solid, elastic hydrocarbon-substituted polysiloxane which is in at least a partially cured state, and thereafter subjecting the finely divided material in a closed pressure vessel at elevated temperatures to direct contact with pressurized steam until a readily millable and peroxide-vulcanizable product is obtained, the aforesaid reclaimed polysiloxane comprising from 5 to 50 per cent of the total weight of both the polysiloxanes and (1) and (2), exclusive of the fillers in the aforesaid two polysiloxanes, and both of the aforesaid hydrocarbon-substituted polysiloxanes of (1) and (2) having their hydrocarbon groups attached to silicon by carbon-silicon linkages and being present in the ratio of from 1.75 to 2.25 hydrocarbon groups per silicon atom, and (3) a curing agent for (1) and (2).

4. The cured product obtained by heat-treating the composition defined in claim 3.

5. A heat-convertible composition of matter comprising (1) a filled, non-reclaimed, previously unvulcanized methyl polysiloxane convertible by heat to the solid, elastic state, (2) a reclaimed vulcanizable filled solid, elastic, methyl polysiloxane convertible by heat to the solid, elastic, substantially infusible and insoluble state obtained by comminuting to a finely divided state a solid, elastic methyl polysiloxane which is in at least a partially cured state, and thereafter subjecting the finely divided material in a closed pressure vessel at elevated temperatures to direct contact with pressurized steam until a readily millable and peroxide vulcanizable product is obtained, the aforesaid reclaimed methylpolysiloxane comprising from 5 to 50 per cent of the total weight of the latter and the methylpolysiloxane described in (1), exclusive of the fillers in (1) and (2), and the aforesaid methyl polysiloxanes in (1) and (2) containing an average of from 1.75 to 2.25 methyl groups per silicon atom, and (3) a curing agent for (1) and (2).

6. The cured product obtained by heat-treating the composition defined in claim 5.

7. The process for recovering in a vulcanizable form a solid, elastic hydrocarbon-substituted polysiloxane which is in at least a partially cured state, the hydrocarbon groups in the aforesaid hydrocarbon-substituted polysiloxane being attached to silicon by carbon-silicon linkages and being present in the ratio of from 1.75 to 2.25 hydrocarbon groups per silicon atom, which process comprises (1) comminuting the aforesaid organopolysiloxane to a finely divided state, and (2) subjecting the finely divided material to direct contact with pressurized steam in a closed pressure vessel at elevated temperatures until a readily millable and peroxide-vulcanizable product is obtained.

8. The process for recovering in a vulcanizable form a solid, elastic hydrocarbon-substituted polysiloxane which is in at least a partially cured state, the hydrocarbon groups in the aforesaid hydrocarbon-substituted polysiloxane being attached to silicon by carbon-silicon linkages and being present in the ratio of from 1.75 to 2.25 hydrocarbon groups per silicon atom, which process comprises (1) comminuting the aforesaid hydrocarbon-substituted polysiloxane to a finely divided state, (2) subjecting the finely divided material to direct contact with pressurized steam in a closed pressure vessel at elevated temperatures until a readily millable and peroxide-vulcanizable product is obtained, and (3) milling the steam-treated material until a homogeneous product is obtained.

9. The process for recovering in a vulcanizable form a solid, elastic methylpolysiloxane containing an average of from 1.75 to 2.25 methyl groups per silicon atom and which is in at least a partially cured state, which process comprises (1) comminuting the aforesaid methylpolysiloxane to a finely divided state, (2) subjecting the finely divided material to direct contact with pressurized steam in a closed pressure vessel at elevated temperatures until a readily millable and peroxide-vulcanizable product is obtained, and (3) milling the steam-treated material until a homogeneous plasticized sheet is obtained.

10. The process for recovering in a vulcanizable form a solid, elastic methyl phenyl polysiloxane which is in at least a partially cured state, the aforesaid polysiloxane containing an average of from 1.75 to 2.25 total methyl phenyl groups per silicon atom, which process comprises (1) comminuting the aforesaid methyl phenyl polysiloxane to a finely divided state, (2) subjecting the finely divided material to direct contact with pressurized steam in a closed pressure vessel at elevated temperatures until a readily millable and peroxide-vulcanizable product is obtained, and (3) milling the steam-treated material until a homogeneous plasticized sheet is obtained.

11. The process for recovering in a vulcanizable form a solid, elastic hydrocarbon-substituted polysiloxane which is in at least a partially cured state, the hydrocarbon groups in the aforesaid hydrocarbon-substituted polysiloxane being attached to silicon by carbon-silicon linkages and being present in the ratio of from 1.75 to 2.25 hydrocarbon groups per silicon atom, which process comprises (1) grinding the aforesaid organopolysiloxane to a finely divided state, and (2) subjecting the finely divided material in a closed pressure vessel to direct contact with pressurized steam at an elevated temperature and at a pressure of from about 5 to 1000 p. s. i. until a readily millable and peroxide-vulcanizable product is obtained.

12. A composition of matter comprising, by weight, (1) from 50 to 95 per cent of a non-reclaimed, previously unvulcanized hydrocarbon-substituted polysiloxane convertible by heat to the solid, elastic state and (2) from 5 to 50 per cent of a reclaimed hydrocarbon-substituted polysiloxane convertible by heat to the solid, elastic, substantially infusible and insoluble state obtained by comminuting to a finely divided state a solid elastic hydrocarbon-substituted polysiloxane which is in at least a partially cured state, and thereafter subjecting the finely divided material in a closed pressure vessel at elevated temperatures to direct contact with pressurized steam until a readily millable and peroxide-vulcanizable product is obtained, both the hydrocarbon-substituted polysiloxanes of (1) and (2) having their hydrocarbon groups attached to silicon by carbon-silicon linkages and the average ratio of hydrocarbon groups per silicon atom being from 1.75 to 2.25.

CHARLES W. PFEIFER.

References Cited in the file of this patent

UNITED STATES PATENTS

| Number | Name | Date |
|---|---|---|
| 2,392,713 | Wright et al. | Jan. 8, 1946 |
| 2,442,196 | Coggeshall | May 25, 1948 |
| 2,480,620 | Warrick | Aug. 30, 1949 |

FOREIGN PATENTS

| Number | Country | Date |
|---|---|---|
| 585,991 | Great Britain | Mar. 4, 1947 |

OTHER REFERENCES

Dow Corning Silastic Facts No. 10, September 1950, p. 2.